Dec. 13, 1949 P. J. CLARK Re. 23,181

CHECK FEEDING MACHINE

Original Filed Nov. 28, 1947 2 Sheets-Sheet 1

Inventor:
Paul J. Clark
by his Attorneys
Howson & Howson

CHECK FEEDING MACHINE

Original Filed Nov. 28, 1947 2 Sheets-Sheet 2

Inventor:
Paul J. Clark
by his Attorneys
Howson & Howson

Reissued Dec. 13, 1949

Re. 23,181

UNITED STATES PATENT OFFICE 23,181

CHECK FEEDING MACHINE

Paul J. Clark, Germantown, Pa.

Original No. 2,470,017, dated May 10, 1949, Serial No. 788,607, November 28, 1947. Application for reissue October 7, 1949, Serial No. 120,071

6 Claims. (Cl. 271—39)

Matter enclosed in heavy brackets [ ] appears in the original patent but forms no part of this reissue specification; matter printed in italics indicates the additions made by reissue

This invention relates to a feeding apparatus and more particularly to an apparatus for the feeding of mixed bank checks that have been in circulation and have been widely handled.

It is extremely difficult to handle such checks from the standpoint of feeding them to a machine such as a photographing machine, and as far as I am aware no one has heretofore succeeded in devising a satisfactory feeding device for that purpose. The checks vary widely in size, thickness and texture, and furthermore in circulation they become creased and otherwise adversely affected from the standpoint of feed handling. Moreover they are frequently interspersed with voucher slips and the like. All of these things contribute to the difficulty of feed handling which heretofore had to be done by hand.

The principal object of the present invention is to supply the need for a satisfactory device which is capable of handling such checks, and which eliminates the necessity of hand feeding which is slow, laborious and subject to human error.

Another object of this invention is the provision of a device for feeding checks which simulates the thumbing action employed by bank clerks in riffling such papers but which feeds checks much faster and without error.

Another object of the invention is the provision of a check-feeding device which does not require any adjustment in the handling of all kinds of bank check paper.

Another object of the invention is a provision of a device of this character which is extremely simple in construction and may be very readily and cheaply manufactured, and which is particularly adapted for use in conjunction with check endorsing and check photographing machines.

Still another object of the invention is the provision of a device of this character which is capable of operation at relatively high speeds and which will feed the checks in an even manner so that they will be properly presented to a machine with which the device is used in any instance.

A further object of the invention is the provision of a device which will feed checks successively regardless of variation of thickness, size or texture from one check to the next, and regardless of the condition of the checks.

A further object of the invention is the provision of a device which does not require any adjustment of the checks and merely requires the placement of a stack of checks on edge on a supporting surface.

These and other objects I attain by the construction shown in the accompanying drawings wherein.

Figure 3:
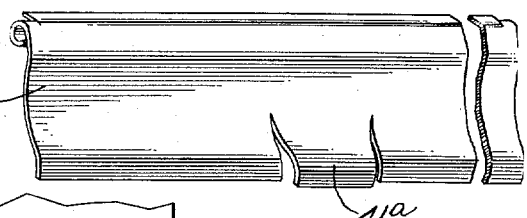
Fig. 3 is a perspective view of the follower member.
Figure 2:
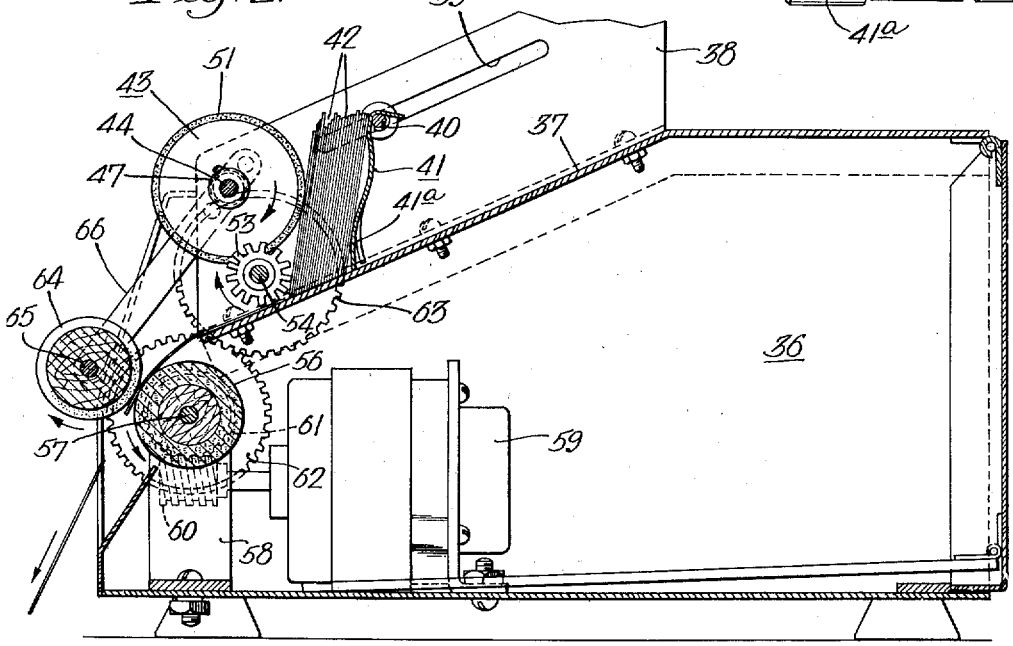
Fig. 2 is a longitudinal sectional view of the same device.
Figure 5:
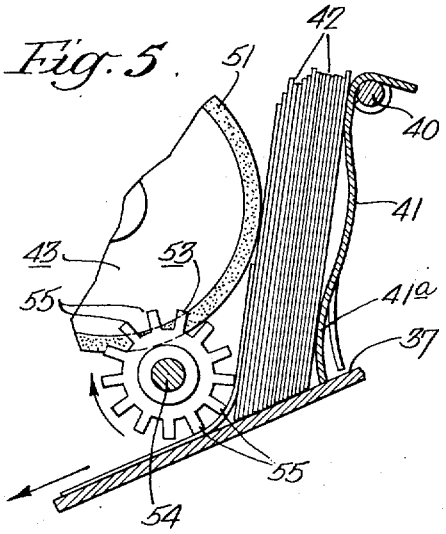
Fig. 5 is a detail view showing the manner in which the stacked checks are successively fed.

In Figs. 1 to 5 there is shown a preferred form of the feeding device which is particularly adapted for the feeding of checks to a check photographing machine of the micro-film type which merely requires the feeding of checks thereto. The housing 36 carries an inclined supporting surface 37 which has a carefully predetermined angle of inclination and which is preferably formed of brass for a reason which will be mentioned presently. A pair of side walls 38 are mounted on the inclined support 37 and are provided with inclined slots 39 which accommodate a slidable rod 40, the latter carrying a follower 41 which is urged by gravity into engagement with the rear face of a stack of checks 42 disposed as illustrated. As shown in Fig. 3, the follower 41 has a central forwardly projecting portion **41*a*** whose purpose will be explained later.

Figure 4:
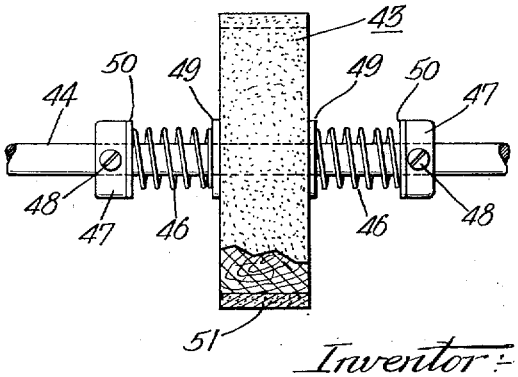
Fig. 4 is a face view of the friction roll and its mounting.

A friction roll 43 is rotatably carried by a rod 44 whose ends are freely disposed in small slots 45 provided in the side walls 38. As shown in Fig. 4, the friction roll 43 is rotatably mounted on the rod 44 between a pair of springs 46 which are confined between collars 47 having set screws 48 for adjustment of the collars along the rod 44. Bearing discs 49 are provided at the inner ends of the springs, while similar bearing discs 50 are provided at the outer ends of the springs. By this arrangement, the springs are caused to apply a slight resistive force to the sides of the friction roll 43, while permitting the roll to rotate during operation of the device.

The friction roll 43 engages the front face of the stack 42 and serves in cooperation with the follower 41 to maintain the stack in position, while permitting the checks to be successively removed therefrom. The roll 43 may be formed of wood and may have a facing 51 of rubber or like material, as shown in Fig. 4.

Figure 1:
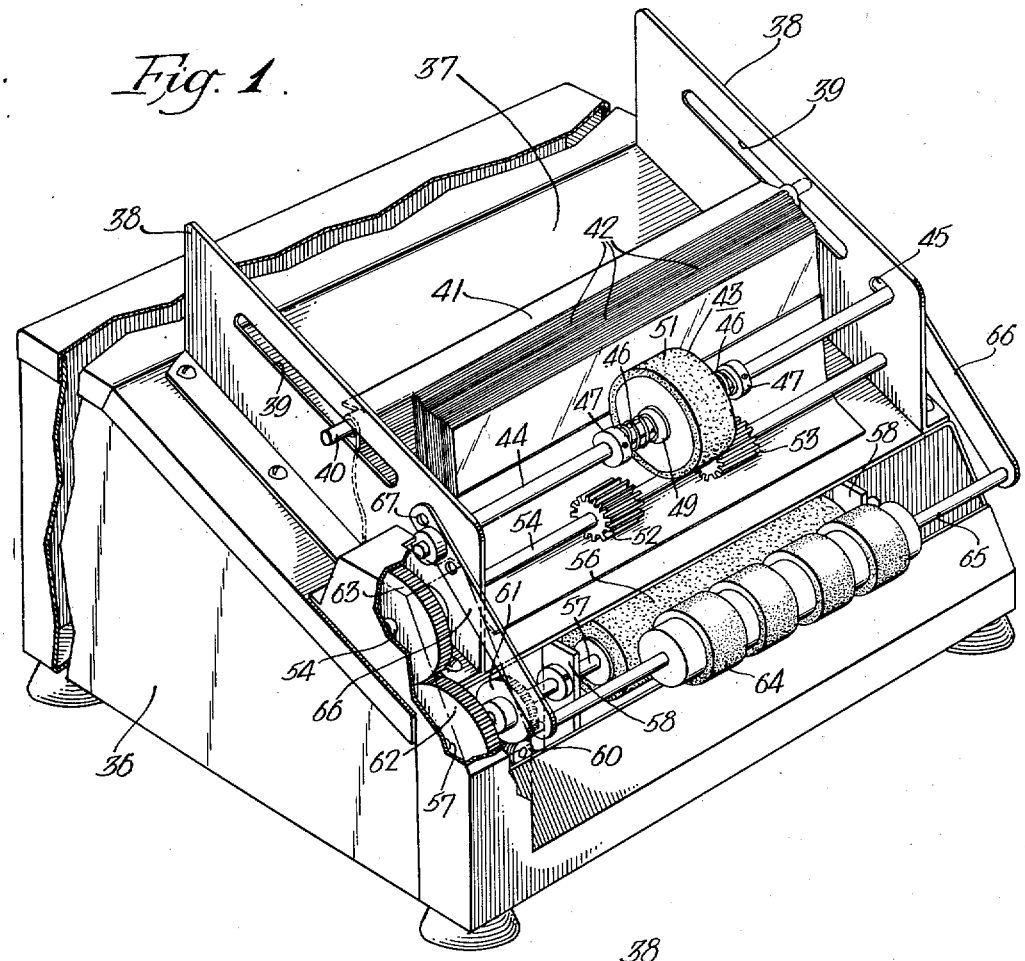
Fig. 1 is a perspective view of a preferred form of the feeding device provided in accordance with the present invention.

The stripper or thumbing means comprises at least one rotatable member having radial friction fingers adapted to engage the front check of the stack below the point of engagement of the friction roll 43. Preferably, the stripper or thumbing means comprises a pair of similar members 52 and 53 carried by a rotatable shaft 54 and disposed on opposite sides of the friction roll 43, as shown in Fig. 1. Each of the members 52 and 53 may be formed of rubber or like material and each has radial resilient fingers 55 as clearly shown in Fig. 5, which serve to strip the checks successively from the stack 42. The shaft 54 is constantly driven at a desired speed so that the resilient friction fingers 55 rotate at a constant angular speed. As previously mentioned, the inclined support 37 is preferably formed of brass because it has been found that brass is best suited for use in conjunction with bank checks in the manner of the present device. With proper inclination of the brass support, the device is practically infallible and it strips the checks off of the stack in rapid succession regardless of variation in thickness, size or texture of the successive checks.

A feed roll 56 is carried by a shaft 57 which is rotatably mounted on bearing members 58 and which is driven from an electric motor 59 through gears 60 and 61. The shaft 54 is driven from shaft 57 through gears 62 and 63. A pressure roll 64, which preferably has a plurality of spaced surface sections, is rotatably carried by a rod 65 supported at the ends of arms 66, which are freely pivoted on the ends of rod 44. As may be seen in Fig. 1, the arms 66 are provided with a plurality of apertures 67 by means of which the roll 64 may be located in different positions to effect feeding of the successive checks at a desired angle. The roll 56 is driven at such a speed that the checks are fed from the device as fast as they are stripped from the stack.

In operation, the resilient friction fingers 55 strip the checks off of the stack in succession and the follower 41 follows the stack as the latter diminishes. The purpose of the forward projection 41a on the follower is to bring the lower part of the last few checks into proper relation to the stripper members. As the checks are stripped from the stack they are fed from the device by the rolls 56 and 64.

*A serious defect of prior check feeding devices has been a tendency to feed two or more checks at a time when the last few checks are reached. The central follower portion 41a cooperates with the stripper members to overcome this defect in the following manner. As the stack diminishes to the point where it is flexible, and particularly when the last few checks are reached, the central portion 41a is effective to bend or "break" the checks and to loosen them from one another, thus overcoming any sticking tendency and insuring against the feeding of more than one check at a time. Since the stripper members engage the checks on opposite sides of the follower portion 41a, the engaged portions of the checks are not solidly backed by the follower due to the fact that portion 41a projects forwardly of the follower portions adjacent the stripper members. Hence the stripper members are better able to strip the checks individually, because the engaged portions of the checks are not under compression tending to hold them together. Furthermore, the bending of the checks by the follower portion 41a rigidifies them and increases their resistance to being moved, and only the foremost check moves because the frictional force exerted thereon by the stripper members overcomes the resistance of that check to movement.*

It is desired to emphasize the fact that variations in thickness and size of the checks have no affect upon the operation of the device which strips the checks off of the stack individually and in succession regardless of such variations. This is an important feature, inasmuch as checks vary considerably in thickness and size and are frequently interspersed with voucher slips and the like.

Figure 6:
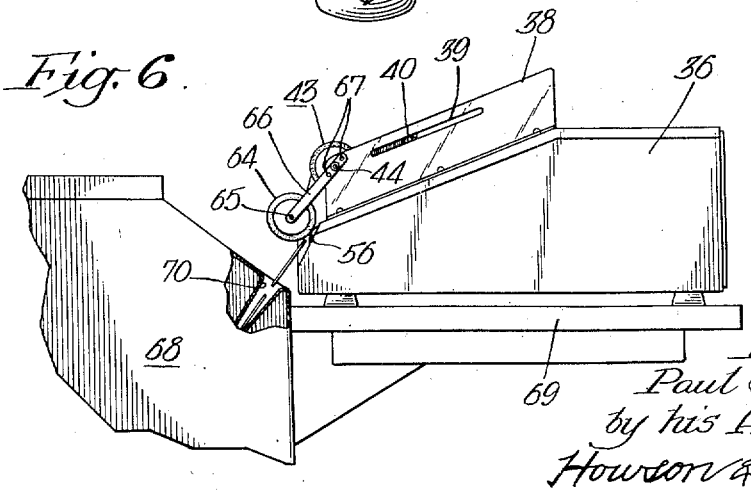
Fig. 6 is a side elevational view showing the feeding device in association with a check photographing machine of the micro-film type, several of which are now on the market.

In Fig. 6 the device is shown in association with a check photographing machine of the microfilm type, represented at 68. This machine has a horizontal support 69 extending from the front thereof, adjacent the feed slot 70. Heretofore it has been the practice for an operator to sit in front of the machine 68, using the support 69 for checks to be fed successively into the machine. This manual feeding of checks is much slower than the rate at which such photographing machines are capable of handling them, and furthermore, the manual feed is subject to error on the part of the operator. As shown in Fig. 6, the device of the present invention may be placed on the horizontal support 69, and in operation the device feeds checks very rapidly into the feed slot 70. This device enables full utilization of the capabilities of the photographing machine and furthermore, it eliminates the error factor of manual feed. The operator simple places a stack of checks in the feed device with the bottom edges of the checks engaging the inclined surface. This is a very simple operation and requires very little time. By the use of the feeding device, an operator is able to handle many times the number of checks than can be handled by manual feed with a given period of time.

While certain forms of the invention have been illustrated and described for the purpose of disclosure, it will be apparent that the invention is not limited to such forms since further modifications and embodiments are obviously possible.

I claim:

[1. In a feeding device adapted particularly for the feeding of mixed bank checks to a photographing machine, an inclined surface for supporting a stack of checks on edge, said surface being disposed at a relatively small acute angle to the horizontal, a follower adapted to engage the back of the stack, said follower being disposed at a relatively greater acute angle to the horizontal, means adapted to engage the front of the stack while permitting removal of the checks in succession, at least one rotatable stripping member positioned so as to be adjacent the lowermost part of said stack at the front thereof, said member having a substantial number of closely-spaced radial resilient vanes, the axis of rotation of said member being substantially equidistant from said surface and the foremost check of said stack, the location of said axis being such as to cause said vanes to engage the foremost check successively and to maintain engagement of the check by a plurality of said vanes during the sliding of the check from the stack, and power means for driving said rotatable member at a predetermined speed to cause successive feeding of said checks accordingly.]

[2. In a feeding device adapted particularly for the feeding of mixed bank checks to a photographing machine, an inclined surface for supporting a stack of checks on edge, said surface being disposed at a relatively small acute angle to the horizontal, a follower adapted to engage the back of the stack, said follower being disposed at a relatively greater acute angle to the horizontal, means adapted to engage the front of the stack while permitting removal of the checks in succession, a pair of spaced rotatable stripping members having a common axis of rotation and positioned so as to be adjacent the lowermost part of said stack at the front thereof, each of said members having a substantial number of closely-spaced radial resilient vanes, the axis of rotation of said members being substantially equidistant from said surface and the foremost check of said stack, the location of said axis being such as to cause the vanes of each of said members to engage the foremost check successively and to maintain engagement of the check by a plurality of said vanes during the sliding of the check from the stack, and power means for driving said rotatable members at a predetermined speed to cause successive feeding of said checks accordingly.]

3. In a feeding device adapted particularly for the feeding of mixed bank checks to a photographing machine, an inclined surface for supporting a stack of checks on edge, said surface being disposed at a relatively small acute angle to the horizontal, a follower adapted to engage the back of the stack, said follower being disposed at a relatively greater acute angle to the horizontal, means adapted to engage the front of the stack while permitting removal of the checks in succession, a pair of spaced rotatable stripping members having a common axis of rotation and positioned so as to be adjacent the lowermost part of said stack at the front thereof, each of said members having a substantial number of closely-spaced radial resilient vanes, the axis of rotation of said members being substantially equidistant from said surface and the foremost check of said stack, the location of said axis being such as to cause the vanes of each of said members to engage the foremost check successively and to maintain engagement of the check by a plurality of said vanes during the sliding of the check from the stack, and power means for driving said rotatable members at a predetermined speed to cause successive feeding of said checks accordingly, said follower having a central portion projecting forwardly of the portions adjacent said members, whereby to bring the lower part of the last few checks into proper relation to said members.

*4. In a feeding device adapted particularly for the feeding of mixed bank checks, a surface inclined at an acute angle to the horizontal for supporting a stack of checks on edge, a follower supported in slidable relation to said surface and adapted to engage the back of said stack, a pair of spaced rotatable stripping members having a common axis of rotation and positioned so as to be adjacent the lowermost part of said stack at the front thereof, the axis of rotation of said members being substantially equidistant from said surface and the foremost check of said stack, the location of said axis being such as to cause said members to engage the foremost check through an arc during the sliding of the check from the stack, power means for driving said members to cause successive feeding of said checks, and means on said follower for effecting a bending of the checks when said stack has diminished to such an extent that it is flexible, thereby to insure individual feeding of the rearmost checks of the stack.*

*5. In a feeding device adapted particularly for the feeding of mixed bank checks, a surface inclined at an acute angle to the horizontal for supporting a stack of checks on edge, a follower supported in slidable relation to said surface and adapted to engage the back of said stack, a pair of spaced rotatable stripping members having a common axis of rotation and positioned so as to be adjacent the lowermost part of said stack at the front thereof, the axis of rotation of said members being substantially equidistant from said surface and the foremost check of said stack, the location of said axis being such as to cause said members to engage the foremost check through an arc during the sliding of the check from the stack, and power means for driving said members to cause successive feeding of said checks, said follower having a portion centrally of said spaced members projecting forwardly of the follower portions adjacent said members to effect a bending of the checks when said stack has diminished to such an extent that it is flexible, thereby to insure individual feeding of the rearmost checks of the stack.*

*6. In a feeding device adapted particularly for the feeding of mixed bank checks, a surface inclined at an acute angle to the horizontal for supporting a stack of checks on edge, a follower supported in slidable relation to said surface and adapted to engage the back of said stack, at least one rotatable stripping member positioned so as to be adjacent the lowermost part of said stack at the front thereof, the axis of rotation of said member being substantially equidistant from said surface and the foremost check of said stack, the location of said axis being such as to cause said member to engage the foremost check through an arc during the sliding of the check from the stack, and power means for driving said member to cause successive feeding of said checks, said follower having a portion in offset relation to said member projecting forwardly of the follower portion adjacent said member to effect a bending of the checks when said stack has diminished to such an extent that it is flexible, thereby to insure individual feeding of the rearmost checks of the stack.*

*7. In a feeding device adapted particularly for the feeding of mixed bank checks, a surface inclined at an acute angle to the horizontal for supporting a stack of checks on edge, a follower supported in slidable relation to said surface and adapted to engage the back of said stack, at least one rotatable stripping member positioned at the front of said stack to frictionally engage the checks and strip them successively from the stack, power means for driving said member to cause successive feeding of said checks, and means on said follower to effect a bending of the checks when said stack has diminished to such an extent that it is flexible, thereby to insure individual feeding of the rearmost checks of the stack.*

*8. In a feeding device adapted particularly for the feeding of mixed bank checks, a surface inclined at an acute angle to the horizontal for supporting a stack of checks on edge, a follower supported in slidable relation to said surface and adapted to engage the back of said stack, a pair of spaced rotatable stripping members having a common axis of rotation and positioned at the front of said stack to frictionally engage the*

*checks and strip them successively from the stack, and power means for driving said members to cause successive feeding of said checks, said follower having a portion centrally of said spaced members projecting forwardly of the follower portions adjacent said members to effect a bending of the checks when said stack has diminished to such an extent that it is flexible, thereby to insure individual feeding of the rearmost checks of the stack.*

PAUL J. CLARK

REFERENCES CITED

The following references are of record in the file of this patent:

UNITED STATES PATENTS

| Number | Name | Date |
|---|---|---|
| 1,058,770 | Markoe | Apr. 15, 1913 |
| 1,599,700 | Davidson | Sept. 14, 1926 |